(12) United States Patent
Busby et al.

(10) Patent No.: US 8,197,612 B2
(45) Date of Patent: Jun. 12, 2012

(54) OPTIMIZATION OF METALLURGICAL PROPERTIES OF A SOLDER JOINT

(75) Inventors: James A Busby, New Paltz, NY (US);
Minhua Lu, Mohegan Lake, NY (US);
Valerie A Oberson, Quebec (CA); Eric D Perfecto, Poughkeepsie, NY (US);
Kamalesh K Srivastava, Wappingers Falls, NY (US); Brian R Sundlof,
Verbank, NY (US); Julien Sylvestre,
Quebec (CA); Renee L Weisman,
Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 326 days.

(21) Appl. No.: 12/111,524

(22) Filed: Apr. 29, 2008

(65) Prior Publication Data

US 2009/0266447 A1    Oct. 29, 2009

(51) Int. Cl.
   *B23K 35/22*    (2006.01)
(52) U.S. Cl. .......................................... 148/24; 420/557
(58) Field of Classification Search .................... 148/24; 420/557
   See application file for complete search history.

(56) References Cited

U.S. PATENT DOCUMENTS

| | | | |
|---|---|---|---|
| 4,778,733 A | 10/1988 | Lubrano et al. | |
| 4,929,423 A | 5/1990 | Tucker et al. | |
| 5,527,628 A | 6/1996 | Anderson et al. | |
| 5,863,493 A | 1/1999 | Achari et al. | |
| 5,958,333 A | 9/1999 | Matsunaga et al. | |
| 5,993,736 A | 11/1999 | Matsunaga et al. | |
| 6,179,935 B1 | 1/2001 | Yamashita et al. | |
| 6,231,691 B1 | 5/2001 | Anderson et al. | |
| 6,436,730 B1 | 8/2002 | Melton et al. | |
| 6,596,621 B1 | 7/2003 | Copeland et al. | |
| 6,638,847 B1 | 10/2003 | Cheung et al. | |
| 6,767,411 B2 | 7/2004 | Yeh et al. | |
| 6,805,974 B2 | 10/2004 | Choi et al. | |
| 6,827,252 B2 * | 12/2004 | Tong et al. | 228/180.22 |
| 6,896,172 B2 | 5/2005 | Taguchi et al. | |
| 7,282,175 B2 | 10/2007 | Amagai et al. | |
| 2004/0155358 A1 * | 8/2004 | Iijima | 257/778 |

* cited by examiner

*Primary Examiner* — Jie Yang
(74) *Attorney, Agent, or Firm* — Joe Petrokaitis; Roberts Mlotkowski Safran & Cole, P.C.

(57) ABSTRACT

Semiconductor packaging techniques are provided which optimize metallurgical properties of a joint using dissimilar solders. A solder composition for Controlled Collapse Chip Connection processing includes a combination of a tin based lead free solder component designed for a chip and a second solder component designed for a laminate. The total concentration of module Ag after reflow is less than 1.9% by weight. A method of manufacturing a solder component is also provided.

15 Claims, 5 Drawing Sheets

US 8,197,612 B2

OPTIMIZATION OF METALLURGICAL PROPERTIES OF A SOLDER JOINT

FIELD OF THE INVENTION

The present invention generally relates to semiconductor packaging techniques using dissimilar solders and, more particularly, to semiconductor packaging techniques which optimize metallurgical properties of a joint using dissimilar solders.

BACKGROUND OF THE INVENTION

Traditionally, high temperature C4 (Controlled Collapse Chip Connection) bumps have been used to bond a chip to a substrate with the most common and widely utilized package being an organic laminate. Conventionally, the C4 bumps (solder bumps) are made from leaded solder, as it has superior properties. For example, lead is known to mitigate thermal coefficient (TCE) mismatch between the chip and the substrate (i.e., organic laminate). Accordingly, stresses imposed during the cooling cycle are mitigated by the C4 bumps, thus preventing delaminations or other damage from occurring to the chip or the substrate.

Lead-free requirements are now being imposed by many countries forcing manufacturers to implement new ways to produce chip to substrate joints. For example, solder interconnects consisting of tin/copper, tin/silver (with high concentrations of silver) and tin/gold in combination with SAC alloys are being used as a replacement for the leaded solder interconnents. With lead-free requirements, though, concerns about electromigration (EM) in C4 interconnections have resurfaced. This is mainly due to the migration to Sn based, Pb-free, solders and of the simultaneous demand for finer pitch interconnections with higher current densities.

Illustratively, during the chip joining reflow, the chip and its substrate are heated to an elevated temperature (about 250° C.) in order to form the solder interconnection joints. The initial portion of the cool down leads to little stress build up; however, as the joints solidify (around 180° C. for small lead-free joints), increased stress is observed on the package. In particular, as the package (laminate, solder and chip) begins to cool, the solder begins to solidify (e.g., at about 180° C.) and the laminate begins to shrink as the chip remains substantially the same size. The difference in thermal expansion between the chip and the substrate is accommodated by out-of-plane deformation (warpage) of the device and the substrate, and by the shear deformation of the solder joints. The peak stresses on the device occur during the cool down portion of the reflow. The warpage and peak stresses are shown graphically in FIG. 1.

As the solder is robust and exceeds the strength of the chip, tensile stresses begin to delaminate structures on the chip. The high shear stresses caused by the TCE mismatch between the chip (3.5 ppm) and the laminate (16 ppm) results in an interfacial failure (i.e., a separation between the BEOL copper and the dielectric under the C4) within the semiconductor device. That is, cracks in chip metallurgy under C4 bumps have been observed (named "white bumps" due to their appearance in CSAM inspection processes) which lead to failure of the device. This is shown representatively in FIG. 2.

With increasingly brittle semiconductor devices at the 65 nm technology node and beyond, and with lead-free alloys which are more resistant to deformation than their leaded counterparts, the assembly process itself can generate sufficient stress to damage the device. Since the stresses and temperature ranges during assembly differ from normal operation of the device, the engineering of a robust assembly process which enables the packaging of the most advanced semiconductor devices requires the proper understanding of the mechanical behaviour of lead-free solder joints. Accordingly, there exists a need in the art to overcome the deficiencies and limitations described hereinabove.

SUMMARY OF THE INVENTION

In a first aspect of the invention, a solder composition for Controlled Collapse Chip Connection processing comprises a combination of a tin based lead free solder component designed for a chip and a second solder component designed for a laminate. The total concentration of module Ag after reflow is less than 1.9% by weight.

In a further aspect of the invention, a solder composition comprises a tin based lead free solder component having an Ag content of 1.8% or less by weight and a second solder component comprising one of SAC and SnCu. The module concentration comprising a join of the tin based lead free solder component and the second solder component is less than 1.9% Ag.

In an additional aspect of the invention, a method of manufacturing a solder component comprises providing a first tin based lead free solder component on a chip and providing a second tin based lead free solder component on a laminate. The method further comprises reflowing the first and second tin based lead free solder components at a predetermined temperature to form an interconnect structure between the chip and the laminate. The reflowing joins the first and second tin based lead free solder components with an Ag module concentration less than 1.9% by weight after the reflowing.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF THE INVENTION

Figure 1:
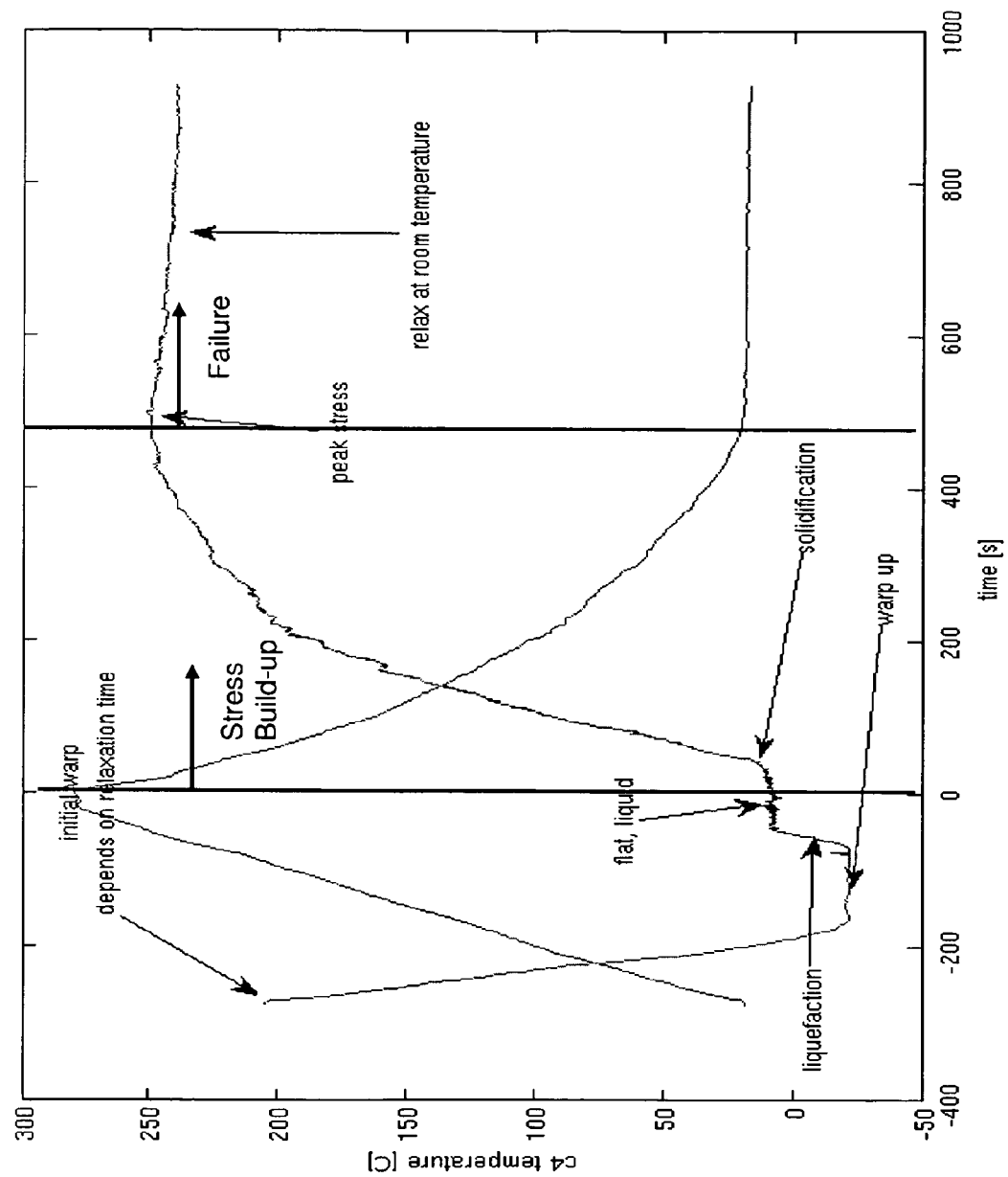
FIG. 1 shows a graph of temperature vs. time for C4 processing.
Figure 2:
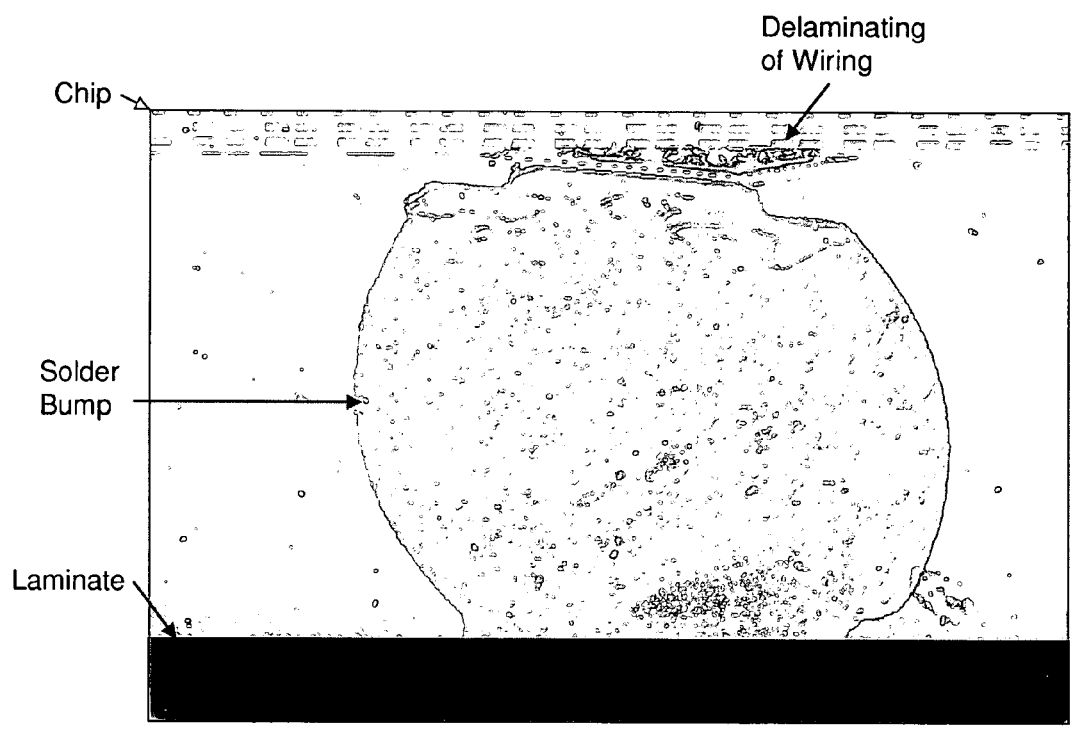
FIG. 2 shows a delaminated wiring layer on a chip after cooling of the package.

The present invention generally relates to semiconductor packaging using dissimilar solders and, more particularly, to semiconductor packaging techniques which optimize metallurgical properties of a joint using dissimilar solders. By implementing the invention, it is possible to prevent wiring layers from delaminating during packaging. More specifically, the present invention provides the ability of the wiring layers to maintain their integrity during cooling when the laminate substrate is contracting at a faster rate than the chip due to a mismatch in TCE.

To accomplish the advantages of the present invention, in embodiments, the metallurgical properties of the joint are optimized by controlling the solder compositions of individual solder components. In particular, the present invention contemplates, in embodiments, the joining of SnAg(X) (solder component for C4) or Sn or SnAg(X)Cu(Y) (where x is less than 1.8% and Y is less than 3%), and SAC (Sn, Cu, Ag) or SnCu (solder component for laminate) in such concentrations that result in a dilute concentration of silver. Alternatively, the present invention contemplates the joining of SnCu (solder component for C4) and SAC or SnCu (solder component for laminate) in such concentrations that result in a dilute or no concentration of silver. In particular, the present invention contemplates a combination of solder components with a percentage by weight of Ag of less than 1.9%. It has been found that the disclosed concentration with controlled Ag concentration has an increased effectiveness of EM lifetime than solders with no Ag. Prior to this invention, SnAg systems, due to plating variability, required high percentages of Ag, i.e., about 2.5 to 4%.

After extensive study, it has been found that creep deformation depends on the solder Ag content, the joint microstructure, the cooling rate near room temperature, and the amount of time spent at an elevated temperature. Lowering the creep resistance of the solder alloy by reducing Ag content has been now found to have a favorable impact on device stress using in situ stress measurements, and direct observation of damage in actual devices. Thus, it is has been now found that stress relaxation offered by reducing the percentage of Ag in the combination of solder components significantly improves the survival rate of the devices, at least during initial chip joining. And, chip-package interaction issues are mitigated by optimized solder hardness via control of bump/laminate solder compositions.

More specifically, the invention optimizes the metallurgical properties of the joint by joining dissimilar solders with a resultant concentration of Ag of 1.9% or less by weight. That is, the present invention contemplates the control of the alloy composition of the solder, which results in a condition for lower microhardness of the joint and the lower melting point of the joint solder. The lower melting point condition results in the use of lower peak temperature in the chip joining operation which, in turn, translates in less stress to the oxide layers under the C4 bump, and less barrier metal (UBM) consumption, etc.

In embodiments, the invention contemplates different solder compositions, with a percentage by weight of Ag below 1.9%. For example, the present invention contemplates the combination of SnAg(x) (which is the solder component for C4) and SAC or SnCu (which is the solder component for the laminate). Another embodiment contemplates the joining of SnCu (which is the solder component for C4) and SAC or SnCu (which is the solder component for the laminate). The effect of the joint solder composition of the present invention on (i) microhardness, (ii) chip warpage due the thermal expansion mismatch between the chip and laminate, and (iii) chip join yield are shown to be beneficial as summarized in Table 1 below.

In particular, Table 1 shows seven different illustrative combinations of components used for joining the chip and laminate (with 0.95Sn0.5Pb being a reference point). In the contemplated combination of components, the volume ratio of the C4 solder component (e.g., SnAg) to the laminate solder component (e.g., SAC (SnAgCu) is about 2:1. Also, the content of Ag in the SAC component could be about 3% or 2% by weight, Cu of about 0.5% and the remaining Sn.

As seen from Table 1, above, the first combination of components has a 2.2% Ag module percentage which results in a yield of 38% during fast cooling (hammer profile). In contrast, the lead free solders with a percentage lower Ag content show a considerable improvement in yield of 95%, 96%, 99% and 99%. The preferable combination of components include SnAg/SAC, SnAg/SnCu, SnCu/SAC and Sn/SAC. In embodiments, the tin based lead free solder component for the C4 can be SnAg(X), SnAg(X)Cu(Y) and SnCu, where (x) is 1.8 or less when the second tin based lead free solder component is SnCu, and (x) is about 0.5 or less when the second tin based lead free solder component is SAC with 3% Ag. The value of Y is less than 3%. More preferably, the maximum Cu content (Y) in the solder after solidification is 1.2%. This is due to the Cu solubility limit during reflow. The rest of the Cu will be deposited in the intermetallics of either the chip or the laminate. Also, the yield for Sn0.7Cu/SnCu is 100% for both slow cool and hammer profile.

As further shown in Table 1, the microhardness of the C4 decreases with the lead free solders as the percentage of Ag is lowered. The microhardness is most desirable when the percentage of Ag is less than 1.9%. In other words, as the percentage of the Ag content is decreased, the lead free solders become more ductile. This, in turn, results in less stresses being imposed on the chip (compared to harder materials).

Figure 3:
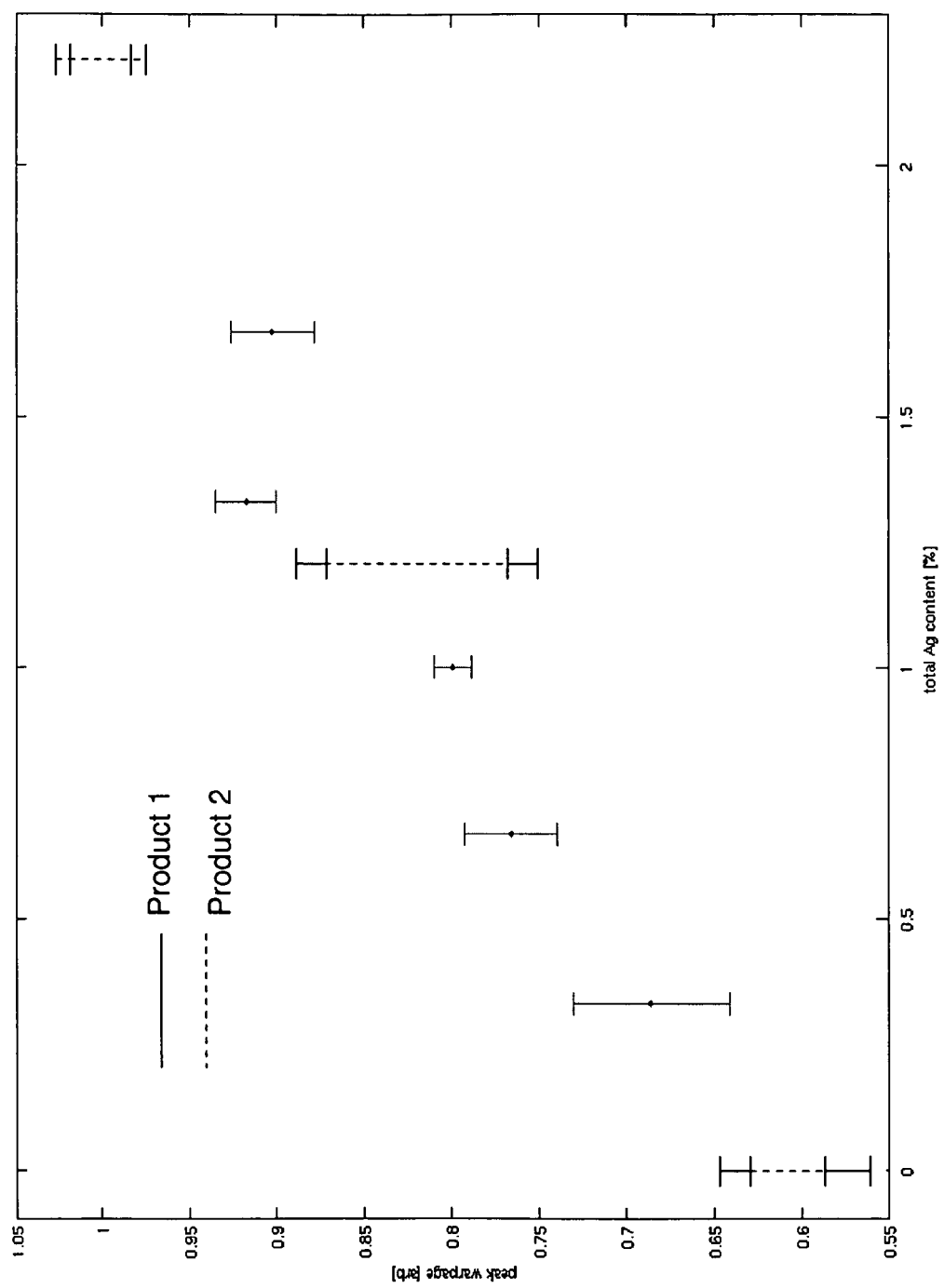
FIG. 3 shows a graph of stress levels (peak warpage) vs. total Ag content for two products.

Table 1 also shows a dynamic chip warpage measurement (DCWM). As shown, the DCWM decreases with a lower percentage of Ag in the combination of components. That is, a decrease in stresses (warpage) correlates very well with the percentage of Ag in the solder. This correlation is also shown in FIG. 3.

In the case of SnCu joining to SnCu, there is a need to increase the joining temperature to eliminate contact non-wetts. Non-contact non-wetts have been found when dissimilar systems were used while using a maximum of 254° C. (vs. a maximum of 260° C. needed for the SnCu/SnCu systems). Although the increase in the joining temperature makes the

TABLE 1

| C4/Laminate Solder | ~Ag % in Module C4s | C4 Micro-Hardness | DCWM | % Good Slow Cool CJ Profile Test & CSAM* | % Good Hammer Profile CSAM |
|---|---|---|---|---|---|
| Sn1.8Ag/SAC | 2.2% | 16 | 1.0 | 97% (73/75) | 38% (28/73) |
| Sn0.5Ag/SAC | 1.3% | 14.5 | .92 | 96% (72/75) | 95% (70/74) |
| Sn1.8Ag/SnCu | 1.2% | 14 | .82 | (74/75) 100% (75/75) | 96% (72/75) |
| Sn0.7Cu/SAC | 1.0% | 14 | .8 | 100% (75/75) | 99% (73/74) |
| Sn0.5Ag/SnCu | 0.33% | 12 | .69 | 100% (75/75) | 99% (73/74) |
| Sn0.7Cu/SnCu | 0 | 11.5 | .61 | 100% (75/75) | 100% (74/74) |
| .95Sn.5Pb | 0 | 6.2 (bulk) | .4 | — | — | process less attractive than SnAg processes, it still provides desirable results, e.g., 100% yield for both slow cool and hammer profiles.

Table 2, below, shows an optimized slow cool profile and hammer profile for different temperature ranges. The different temperature ranges can be utilized at different times during the joining processes.

TABLE 2

| Temperature Range | Optimized Slow Cool Profile | Hammer Profile |
|---|---|---|
| S1 (217° C. to 170° C.) | <1.0 C./sec. | 4.0 C./sec. |
| S2 (170° C. to 100° C.) | <1.0 C./sec. | 6.0 C./sec. |
| S3 (100° C. to 70° C.) | <0.5 C./sec. | 3.0 C./sec. |
| S4 (70° C. to Room Temp. | <0.2 C./sec. | <1.5 C./sec. |

Table 3, below, shows favorable test results implementing the present invention with a 300 mm qualification. For example, Table 3 shows that there are no fails under several different conditions, using Sn-0.5% Ag (solder component for the C4) and SnCu/SAC (solder component for the laminate). The combination of Sn-0.5% Ag and SnCu/SAC results in an Ag percentage by weight of about 1.3%.

TABLE 3

| Chip Side | Organic | Quant | Condition | Status |
|---|---|---|---|---|
| Sn—0.5% Ag | SnCu/SAC | 34 | 150 C., 0.7 A Neg/Pos 1000 hrs | Completed. No fails |
| Sn—0.5% Ag | SnCu/SAC | 40 | 170 C., 500 hrs | Completed. No fails |
| Sn—0.5% Ag | SnCu/SAC | 40 | −55 C./125 C., 500 cyc | Completed. No fails |
| Sn—0.5% AG | SnCu/SAC | 20 | 85 C./85% RH/3 V, 500 hrs | Completed. No fails |

FIG. 3 shows a graph of stress levels (peak warpage) vs. total Ag content for two products. More specifically, the graph of FIG. 3 shows the peak warpage for products having a percentage of Ag as follows: 2.2%, 1.3%, 1.2%, 1.0%, 0.33% and 0%. As shown in the graphical representation of FIG. 3, a reduction in the Ag content results in a reduction in warpage for both products. For example, maximum warpage (e.g., maximum stress) is seen on both products with an Ag content of 2.2%. In contrast, the warpage decreases to a range of about 0.65 to 0.73 for the products with an Ag content of about 0.33%.

Figure 4A:
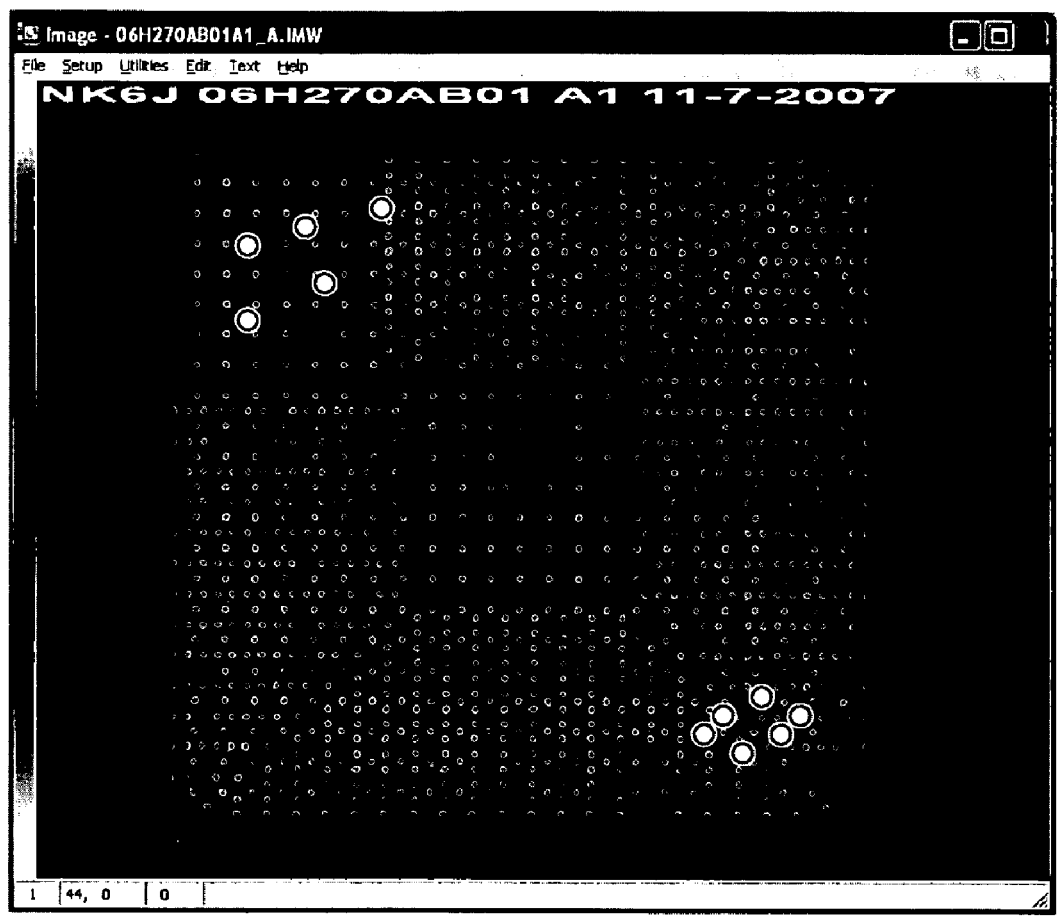
FIGS. 4a and 4b show CSAM images of packaged chips.
Figure 4B:
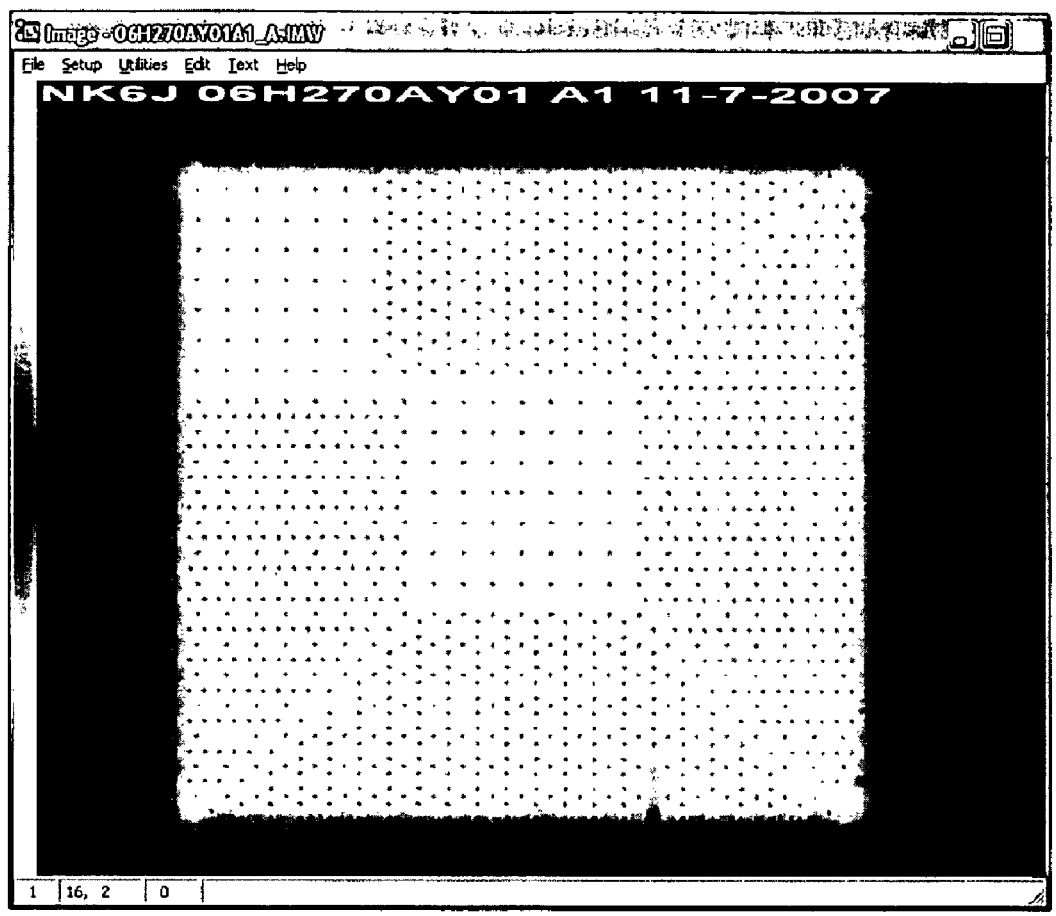

FIGS. 4a and 4b show Ultrasonic C-mode scanning acoustic microscopy (CSAM) images of packaged chips. CSAM is widely used in the semiconductor industry for reliability testing and product inspection due to its ability to nondestructively detect defects in IC packaging. More specifically, FIG. 4a shows an illustrative CSAM image for a chip with 2.2% Ag content in the reflowed solder. In this representative image, white bumps appear in the corners of the image, depicting wiring failure. In contrast, FIG. 4b shows an illustrative CSAM image for a chip with 1.4% or less of Ag content in the reflowed solder. In this image, the packaged device is shown to be defect free (no white bumps).

In sum, it has been demonstrated that Ag technology provides a robust packaging technology that effectively improves the electromigration lifetime of Sn based solder especially SnCu solder; however, higher percentages of Ag create white bumps and Sn plate issues. Also, the lower concentrations of Ag can be achieved by refinement of the Ag percentage via joining of dissimilar solders for the C4 and laminates. In fact, it has been shown that tin based solder composition with silver less than 1.9 weight percentage start improving the robustness of the C4 join.

The structures as described above are used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

While the invention has been described in terms of embodiments, those of skill in the art will recognize that the invention can be practiced with modifications and in the spirit and scope of the appended claims.

What is claimed is:

1. A solder composition for Controlled Collapse Chip Connection processing comprising a combination of a tin based lead free solder component designed for a chip and a second solder component designed for a laminate with a total concentration of module Ag after reflow being less than 1.9% by weight,
wherein a volume ratio of the tin based lead free solder component to the second solder component is 2:1;
the tin based lead free solder component is SnAg(x),
where (x) represents a percentage of Ag;
the second solder component is one of SAC and SnCu; and
where (x) is 1.8 wt % or less when the second solder component is SnCu, and (x) is about 0.5 wt % or less when the second solder component is SAC.

2. The solder composition of claim 1, wherein a component concentration of Ag, (x), is at least 0.5% by weight.

3. The solder composition of claim 1, wherein (x) is less than 1.8 wt % when the second solder component is SnCu.

4. The solder composition of claim 3, wherein a module concentration of Ag is greater than 0.33% by weight and the second solder component is SnCu.

5. The solder composition of claim 1, wherein (x) is zero and the second solder component is SAC.

6. The solder composition of claim 1, wherein the SAC comprises 3 wt % Ag and (y) is less than 3 wt %.

7. The solder composition of claim 6, wherein a maximum Cu content (y) after solidification is 1.2 wt %.

8. The solder composition of claim 1, wherein the second solder component is SnCu to lower the total concentration of module Ag and creep resistance of the solder composition.

9. The solder composition of claim 1, wherein the second solder component is SAC to lower the total concentration of module Ag and creep resistance of the solder composition.

10. A solder composition, comprising:
   a tin based lead free solder component is SnAg(x), where (x) represents a percentage of Ag; and
   a second solder component is one of SAC and SnCu, wherein:
   (x) is 1.8 wt % or less when the second solder component is SnCu, and (x) is about 0.5 wt % or less when the second component is SAC;
   a module concentration comprising a join of the tin based lead free solder component and the second solder component is less than 1.9% Ag by weight; and
   a volume ratio of the tin based lead free solder component to the second solder component is 2:1.

11. The solder composition of claim 10, wherein (x) is at least 0.5 wt %.

12. The solder composition of claim 10, wherein (x) is less than 1.8 wt % when the second solder component is SnCu.

13. The solder composition of claim 10, wherein a module concentration of Ag is greater than 0.33% by weight.

14. The solder composition of claim 10, wherein (x) is zero and the second solder component is of SAC.

15. A method of manufacturing a solder component, comprising:
   providing a tin based lead free solder component on a chip;
   providing a second solder component on a laminate;
   reflowing the tin based lead free solder component and the second solder component at a predetermined temperature to form an interconnect structure between the chip and the laminate, wherein the reflowing joins the tin based lead free solder component and the second solder component with an Ag module concentration of less than 1.9% by weight after the reflowing,
   wherein a volume ratio of the tin based lead free solder component to the second solder component is 2:1;
   the tin based lead free solder component is SnAg(x), where (x) represents a percentage of Ag;
   the second solder component is one of SAC and SnCu; and
   where (x) is 1.8 wt % or less when the second solder component is SnCu, and (x) is about 0.5 wt % or less when the second component is SAC.

\* \* \* \* \*